United States Patent
Mansour et al.

(10) Patent No.: US 10,085,197 B1
(45) Date of Patent: Sep. 25, 2018

(54) CONTROLLED HANDOVER OF UES TO REDUCE WIRELESS BACKHAUL CONGESTION

(71) Applicant: Sprint Spectrum L.P., Overland Park, KS (US)

(72) Inventors: Nagi A. Mansour, Arlington, VA (US); Pinal Tailor, Ashburn, VA (US); Sandeep Mangrulkar, Chantilly, VA (US); Yun Sung Kim, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/188,043

(22) Filed: Jun. 21, 2016

(51) Int. Cl.
| | |
|---|---|
| *H04W 36/30* | (2009.01) |
| *H04L 12/26* | (2006.01) |
| *H04B 3/36* | (2006.01) |
| *H04L 29/08* | (2006.01) |
| *H04M 1/253* | (2006.01) |
| *H04W 28/02* | (2009.01) |
| *H04W 24/08* | (2009.01) |
| *H04W 88/04* | (2009.01) |
| *H04W 88/16* | (2009.01) |
| *H04W 80/10* | (2009.01) |

(52) U.S. Cl.
CPC .............. *H04W 36/30* (2013.01); *H04B 3/36* (2013.01); *H04L 43/16* (2013.01); *H04L 67/303* (2013.01); *H04M 1/2535* (2013.01); *H04W 24/08* (2013.01); *H04W 28/0268* (2013.01); *H04W 28/0278* (2013.01); *H04M 2207/206* (2013.01); *H04W 80/10* (2013.01); *H04W 88/04* (2013.01); *H04W 88/16* (2013.01)

(58) Field of Classification Search
CPC ... H04W 84/047; H04W 28/08; H04W 36/22; H04W 36/14; H04W 28/0268; H04B 7/2606; H04B 7/155; H04B 7/15
See application file for complete search history.

(56) References Cited

U.S. PATENT DOCUMENTS

| 6,865,185 B1 * | 3/2005 | Patel ....................... H04L 47/12 370/310 |
| 2010/0315957 A1 | 12/2010 | Koo et al. |

(Continued)

FOREIGN PATENT DOCUMENTS

| WO | 2015087042 | 6/2015 |

OTHER PUBLICATIONS

3GPP TS 23.203 V13.0.0 Policy and charging control architecture Jun. 2014.*

*Primary Examiner* — Ernest Tacsik

(57) ABSTRACT

In an example method, a donor base station determines that an air interface, over which the donor base station serves a relay-UE and plurality of second UEs, is threshold highly congested and that a relay base station is serving a threshold high number of first UEs. The relay base station is coupled to a relay-UE that provides wireless connectivity for the relay base station and that is served by the donor base station. Responsive to at least the determining that the air interface is threshold highly congested and that the relay base station is serving a threshold high number of first UEs, the donor base station (i) selects one or more of the plurality of second UEs and (ii) hands over the selected one or more second UEs to another base station other than the donor base station.

20 Claims, 4 Drawing Sheets

(56) References Cited

U.S. PATENT DOCUMENTS

| | | | |
|---|---|---|---|
| 2011/0164593 A1 | 7/2011 | Huet et al. | |
| 2012/0236782 A1* | 9/2012 | Bucknell | H04B 7/155 370/315 |
| 2013/0010598 A1* | 1/2013 | Ludwig | H04L 47/10 370/235 |
| 2013/0045740 A1* | 2/2013 | Gayde | H04W 48/06 455/436 |
| 2013/0279364 A1 | 10/2013 | Nagata et al. | |
| 2015/0249950 A1* | 9/2015 | Teyeb | H04W 36/0016 455/437 |
| 2015/0304016 A1* | 10/2015 | Choi | H04B 7/2606 455/11.1 |

* cited by examiner

CONTROLLED HANDOVER OF UES TO REDUCE WIRELESS BACKHAUL CONGESTION

BACKGROUND

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices (whether or not technically operated by a human user), can operate. In turn, each base station may be coupled with network infrastructure, including one or more gateways and switches, that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

When a cellular wireless network serves UEs, the network may allocate various resources to facilitate communication to and from the UEs. In an example arrangement, for instance, the network may allocate "bearers" that define physical or logical communication channels extending between the UEs and a transport network. Each such bearer may include a radio-bearer component that extends between a UE and a serving base station and an access-bearer component that extends between the serving base station and the transport network. Further, each such bearer may have an associated service level, such as "best effort" or "guaranteed bit rate" for instance, to support a particular quality of service or type of service. In practice, the network may then allocate a number of such bearers for a UE, to support various different types of communication services.

By way of example, when the UE first enters into coverage of a base station, the UE may engage in a registration or "attachment" process that causes the network to allocate for the UE certain default bearers in accordance with the UE's service profile. For instance, if the UE's service profile indicates that the UE supports general packet-data communication (such as web browsing, file transfer, and the like), the network may allocate for the UE a default bearer for carrying such communications with a best-effort service level. Further, if the UE's service profile indicates that the UE supports voice over Internet Protocol (VoIP) communications or other such real-time packet-based communication service, the network may allocate for the UE a default bearer to support Session Initiation Protocol (SIP) signaling or the like to facilitate setup of such communications.

In turn, as a UE is being served by a base station, if the UE is going to engage in another type of communication service, the network may allocate for the UE still other bearers, possibly with other service levels. For instance, if the UE supports VoIP service and seeks to engage in a VoIP call, or a VoIP call server seeks to connect a call to the UE, the network may allocate for the UE a dedicated bearer having a guaranteed bit rate and perhaps other high service level attributes, to carry the VoIP bearer traffic (e.g., packets representing voice), and the UE may then engage in the VoIP call via that bearer. Further, if the UE supports online gaming service and seeks to engage in gaming communication, the network may allocate for the UE a dedicated bearer having a particular service level appropriate for that gaming communication, and the UE may then engage in the gaming via that bearer.

Each bearer that the network allocates to a UE may have an associated quality of service class indicator (QCI) or other indication of the bearer's service level. For instance, a bearer for carrying VoIP bearer traffic may have a QCI of 1, a bearer for carrying SIP signaling or the like may have a QCI of 5, and bearer for carrying best-effort traffic may have a QCI of 8 or 9. When a base station serves a UE, the base station may maintain a context record for the UE, identifying each bearer that the UE has, and specifying the QCI level and/or other attributes of the bearer, for reference by the base station to help ensure appropriate service of the UE.

In a typical cellular wireless network, each of a base station's coverage areas will operate on one or more carrier frequencies and will define various channels for carrying control and bearer data between the base station and the UEs served by the base station. The base station may then manage communication of packet data to and from served UEs over the air interface. For instance, as the base station receives packet data from the network infrastructure for transmission to UEs on various bearers, the base station may queue the data, schedule use of particular downlink air interface resources (e.g., channels, resource blocks, or the like) to carry the data, and transmit the data on the scheduled resources to the destination UEs. Likewise, as UEs have data to transmit on various bearers, the base station may schedule use of particular uplink air interface resources to carry the data, and the UEs may transmit the data on the scheduled uplink resources to the base station.

Optimally, a wireless service provider will strategically implement base stations throughout a market area so that served UEs can move between the base station coverage areas without loss of coverage. Each base station may include an antenna structure and associated equipment, and the wireless service provider may connect the base station by a landline cable (e.g., a T1 line) with the service provider's network infrastructure to enable the base station to communicate with a signaling controller (e.g., MME), gateway system, other base stations, and the like.

In practice, however, it may be impractical for a wireless service provider to run landline connections to base stations in certain locations. For instance, where a service provider seeks to provide many small coverage areas blanketing a market area or to fill in coverage holes between coverage of other base stations, the service provider may implement many small-cell base stations throughout the market area, but it may be inefficient or undesirable to run landline cables to every one of those small-cell base stations.

To connect a base station with the network infrastructure in such a situation, the wireless service provider may implement a wireless backhaul connection between the base station and another base station of the service provider's network. In this situation, the base station at issue operates as a relay base station, and the other base station operates as a donor base station. In practice, the relay base station includes or is coupled (e.g., via a local area network or other connection) with a UE, referred to as a relay-UE, and the donor base station then serves the relay-UE in much the same way that the donor base station serves other UEs. Further, the relay base station itself serves UEs, in much the same way that any base station would. For example, when a UE enters into coverage of the relay base station, the UE may signal to the relay base station to initiate an attach process, the UE may acquire an IP address, and an MME may engage in signaling to establish one or more bearers between the UE and a gateway system. Each of these bearers though, would pass via the wireless backhaul connection.

OVERVIEW

In practice, the air interface over which a donor base station serves UEs will have a limited capacity to carry control and bearer data to and from served UEs, including, for instance, any served relay-UEs in addition to any served non-relay UEs. As a result, there may be times when the air interface becomes so loaded (congested) that the donor base station cannot sufficiently provide resources requested by a relay-UE. By way of example, the donor base station may be serving a plurality of non-relay UEs over an air interface. At the same time, the donor base station may also be serving a relay-UE over the air interface, and a relay base station that the relay-UE is providing wireless backhaul connectivity for may be serving one or more UEs. If the air interface becomes very loaded, the donor base station may be unable to allocate sufficient downlink and/or uplink resources for communicating with the relay-UE since the relay-UE would be competing with the other non-relay UEs being served by the donor base station for downlink and/or uplink air interface resources (e.g., channels, resource blocks, or the like).

Further, such congestion on the air interface could lead to delays in transmission on the wireless backhaul connection between the relay-UE and the donor base station. For example, if the relay-UE requests resources and the donor base station does not within a timely manner grant to the relay-UE all of the requested resources, the relay-UE may be forced to temporarily buffer data at the relay-UE until the relay-UE is granted resources to transmit the data to the donor base station. Similarly, due to congestion on the air interface, the donor base station may be forced to temporarily buffer data at the donor base station until resources are available to transmit data to the relay-UE. Delays on the wireless backhaul connection could pose a problem for the UEs being served by the relay base station. For instance, delays in transmission on the wireless backhaul connection could lead to delays in transmissions of control and bearer data to and from the UEs being served by the relay base station, resulting in a poor user experience.

In accordance with the present disclosure, to help manage service of UEs in the face of heavy air interface load, a donor base station may be configured to monitor the number of UEs being served by the relay base station and monitor the level of load on the air interface, and to take remedial action when the relay base station is serving so many UEs and the load becomes so high that the donor base station cannot sufficiently provide resources for wireless backhaul communication (e.g., resources requested by the relay-UE for uplink communication on the wireless backhaul connection or resources for downlink communication on the wireless backhaul connection). For example, the donor base station may be configured to detect that the air interface load is threshold high and the number of UEs being served by the relay base station is threshold high, and to respond to that scenario by selecting and handing out from the donor base station's coverage one or more non-relay UEs, so as to free up capacity to better serve the relay-UE. Freeing up capacity to better serve the relay-UE may in turn enable the relay base station to better serve its threshold high number of UEs.

In some examples, the donor base station may select the one or more non-relay UEs based at least on interruption-sensitivities of the communications of the non-relay UEs being served by the donor base station. For example, the donor base station may select one or more non-relay UEs based at least on the non-relay UEs not being engaged in interruption-sensitive communication (such as streaming video communication, gaming communication, or other packet-based real-time media communication).

Furthermore, the donor base station may select the other base station based at least on the other base station having sufficient capacity to serve the selected one or more non-relay UEs. For example, the donor base station may identify a plurality of neighboring base stations, and select the other base station from among the plurality of neighboring base stations based at least on the selected one or more non-relay UEs having reported detecting coverage of the other base station and based at least on the other base station having threshold low air interface load.

Accordingly, in one respect, disclosed is a method of managing communication over a wireless backhaul connection between a donor base station and a relay. The relay includes a relay base station and a relay-UE that provides wireless backhaul connectivity for the relay base station. The donor base station serves the relay-UE over an air interface defining the wireless backhaul connection. The relay base station serves one or more first UEs. And the donor base station serves a plurality of second UEs over the air interface. According to the method, the donor base station determines that the air interface is threshold highly congested and that the relay base station is serving a threshold high number of first UEs. Responsive to at least the determining that the air interface is threshold highly congested and that the relay base station is serving a threshold high number of first UEs, the donor base station (i) selects one or more of the plurality of second UEs and (ii) hands over the selected one or more second UEs to another base station other than the donor base station.

In another respect, disclosed is a base station operable in an access network to manage communication over a wireless backhaul connection between the base station and a relay. The relay includes a relay base station and a relay-UE that provides wireless backhaul connectivity for the relay base station. The base station serves the relay-UE over an air interface defining the wireless backhaul connection. The relay base station serves one or more first UEs. And the base station serves a plurality of second UEs over an air interface. The base station includes a wireless communication interface configured for communicating over the air interface. The base station further includes a controller comprising at least one processing unit, data storage, and program instructions stored in the data storage and executable by the processing unit to carry out various operations. In particular, the operations include determining that the air interface is threshold highly congested and that the relay base station is serving a threshold high number of first UEs. The operations also include, responsive to at least the determining that the air interface is threshold highly congested and that the relay base station is serving a threshold high number of first UEs, (i) selecting one or more of the plurality of second UEs and (ii) handing over the selected one or more second UEs to another base station other than the base station.

In still another respect, another method for managing communication over a wireless backhaul connection between a donor base station and a relay is provided. The relay includes a relay base station and a relay-UE that provides wireless backhaul connectivity for the relay base station. The donor base station serves the relay-UE over an air interface defining the wireless backhaul connection. The relay base station serves one or more first UEs. And the donor base station serves a plurality of second UEs over the air interface. The method includes detecting threshold high load on the wireless backhaul connection. The method further includes, responsive to detecting the threshold high load, (i) identifying one or more of the plurality of second UEs based at least on the identified one or more second UEs not being engaged in interruption-sensitive communication, (ii) selecting a target base station from among a plurality of neighboring base stations based at least on the selected target base station having threshold low air interface load and based at least on one of the identified one or more second UEs having reported detecting coverage of the selected target base station, and (iii) handing over at least one of the identified one or more second UEs from the donor base station to the selected target base station based at least on the at least one second UE having reported detecting coverage of the selected target base station and based at least on the at least one second UE not being engaged in interruption-sensitive communication.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present methods and systems will be described herein in the context of Long Term Evolution (LTE) as an example radio access protocol and associated network arrangement. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processing unit executing software instructions for instance.

Figure 1:
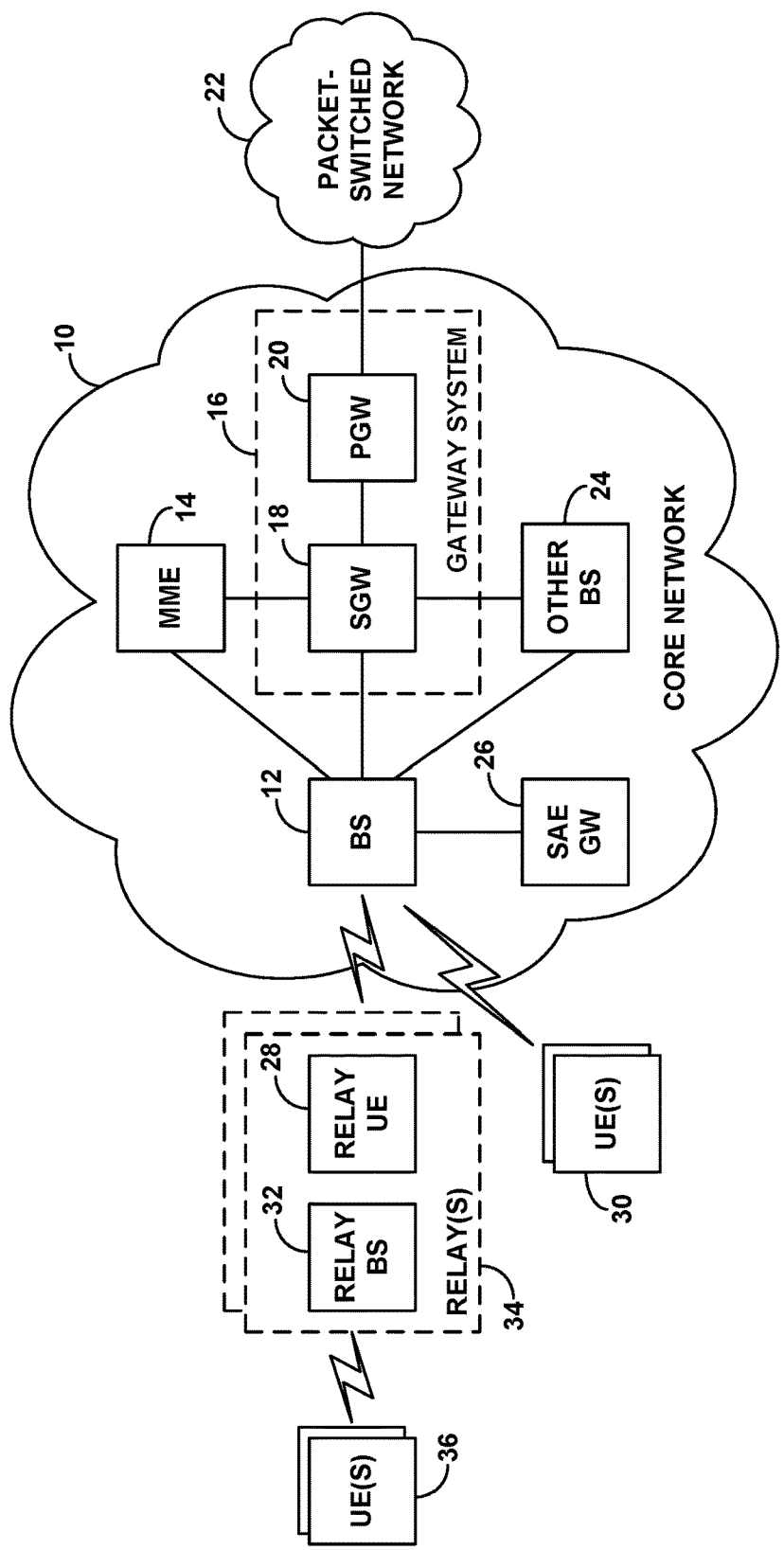
FIG. 1 is a simplified block diagram of an example wireless communication system in which features of the present disclosure can be implemented.

Referring to the drawings, as noted above, FIG. 1 is a simplified block diagram of a wireless communication system in which features of the present disclosure can be implemented. In particular, FIG. 1 depicts a representative LTE core network 10, which functions primarily to serve UEs with wireless packet data communication service, including possible voice-over-packet service, but may also provide other functions. The LTE core network 10 may be a packet-switched network, compliant with the industry standard system architecture evolution (SAE) for the LTE protocol.

As shown, LTE core network 10 has an example base station (BS) 12, which has an antenna structure and associated equipment (not shown) for engaging in LTE communication over an LTE air interface. Base station 12 then has communication interfaces with an example MME 14, functioning as a signaling controller for the LTE core network 10. Further, base station 12 has a communication interface with a gateway system 16, which includes a serving gateway (SGW) 18 and a packet-data-network gateway (PGW) 20, the PGW provides connectivity with a packet-switched transport network 22 such as the Internet, and the MME 14 has a respective communication interface with the SGW 18 as well. In addition, base station 12 has a communication interface, such as an industry standard X2 interface, with another base station 24.

As further shown, LTE core network 10 then may also optionally include, and base station 12 may have an interface with, a special core network gateway depicted as an "SAE GW" 26, which serves to provide connectivity with the LTE core network 10, for a relay-UE and relay base station as noted above for instance.

Additionally shown in FIG. 1, within coverage of base station 12, are then a plurality of UEs, including at least one relay-UE 28 and at least one non-relay UE 30. Each non-relay UE 30 may be an end-user UE such as one of the types of UEs noted above (e.g., cell phone, tablet computer, tracking device, etc.) that is not set to provide wireless backhaul connectivity for a relay base station. Whereas, each relay-UE 28 may be a UE that is set to provide wireless backhaul connectivity for a relay base station 32. As such, a relay-UE could be a conventional UE (e.g., cell phone or the like) that is locally coupled with a relay base station (e.g., via a local area network or direct cable or wireless connection) and that is configured to operate as a relay-UE for the relay base station, or the relay-UE could be a UE module that is incorporated within a base station, thereby allowing the base station to obtain wireless backhaul connectivity and thus function as a relay base station. FIG. 1 thus further depicts relay UE 28 and relay base station 32 cooperatively defining a relay 34. As such, base station 12 serves as a donor base station for relay 34 and as a conventional base station for each non-relay UE 30, relay 34 has a wireless backhaul connection with the donor base station 12, and relay 34 then provides its own wireless coverage for serving one or more other UEs 36.

In practice, each of these UEs may be configured within the LTE core network 10 as a device to be served by the network (such as authorized subscriber device), and a mechanism may be provided to distinguish relay-UEs from conventional UEs, so as to facilitate treating relay-UEs differently than conventional UEs. By way of example, a relay-UE may have a special identifier or be served by the network under a special network identifier (e.g., a special public land mobile network (PLMN) identifier, or special packet data network (PDN) connection identifier), indicating that the relay-UE will be operating as a relay-UE. Whereas a conventional UE may have an identifier or be served by the network under an identifier that does not indicate the UE will be operating as a relay-UE and thus that may establish the UE is not a relay-UE. Thus, when a UE attaches with the network, such as with base station 12, the network (e.g., the base station, MME, and/or other network entity) may determine whether the UE is a relay-UE (i.e., whether the UE provides wireless backhaul connectivity for a relay base station) or not, based on such identification or other information provided by the UE during attachment or noted in a network profile record for the UE.

The LTE air interface over which base station 12 engages in communication with relay-UE 28 and non-relay UEs 30 operates on a carrier that defines one or more frequency channels of defined bandwidth, such as 1.4 MHz, 5 MHz, 10 MHz, 15 MHz or 20 MHz, with the downlink and uplink occupying separate frequency channels (in a frequency division duplex arrangement) or being multiplexed over time on a shared frequency channel (in a time division duplex arrangement). A representative LTE frequency channel is then divided over time into 10-millisecond frames and 1-millisecond subframes. Further, each subframe is divided over time into 67-microsecond symbol time segments, and the frequency bandwidth is divided into subcarriers that are typically spaced apart from each other by 15 kHz.

With this arrangement, every subframe essentially defines an array of resource elements, each of which is at a particular subcarrier and spans a particular symbol time segment, and these resource elements can be modulated to represent bits being communicated over the air interface. Further, various resource elements are grouped for specific use. For instance, certain resource elements cooperatively define a control channel, other resource elements cooperatively define a reference-signal channel, and other resource elements are divided into groups defining physical resource blocks (PRBs) allocated by base station 12 for carrying data to and from a served UE.

When a UE, particularly a non-relay UE 30, enters into coverage of base station 12 in this arrangement, the UE may transmit an access request to the base station on an uplink random access channel and engage in further signaling with the base station to establish a Radio Resource Control (RRC) connection through which the UE and base station can then engage in air interface communication. Through the RRC connection, the UE may transmit an attach request to register with the LTE network, which the base station would forward to the MME. And upon authenticating the UE, the MME would then engage in signaling with the base station and SGW (and, in turn, the SGW engages in signaling with the PGW), to set up for the UE one or more bearers for carrying packet data between the UE and the packet-switched network 22. The UE may then be served by the LTE core network in an idle mode or a connected/active mode. In the idle mode, the UE may monitor a downlink control channel to check for page messages and other information regarding incoming communications and may similarly transmit uplink control signaling to initiate communications or for other reasons. In the connected/active mode, the UE may have particular traffic channel resources assigned by the base station, which the UE may use to engage in communication of bearer traffic and the like.

When relay-UE 28 enters or is positioned in coverage of base station 12, relay-UE may also attach to base station 12. For instance, relay-UE 28 may transmit an access request to the base station, establish an RRC connection, and transmit an attach request to register with the LTE network. Further, the network may recognize that relay-UE 28 is a relay-UE, and may set up a bearer connection for relay-UE 28.

In practice, the air interface over which base station 12 serves UEs will have a limited capacity to carry control and bearer data to and from served UEs, including relay-UE 28 and the non-relay UEs 30. For example, base station 12 may provide service on one or more carriers each having a defined, finite frequency bandwidth, and each carrier may have a limited extent of resources for carrying communications between the base station and one or more served UEs. As noted above, difficulty can arise when the air interface becomes so loaded (congested) that base station 12 cannot sufficiently provide resources requested by relay-UE 28. By way of example, if the air interface becomes very loaded, base station 12 may be unable to allocate sufficient downlink and/or uplink resources for communication with relay-UE 28 since relay-UE 28 would be competing with the non-relay UEs 30 for downlink and/or uplink air interface resources.

As further noted above, such congestion on the air interface could lead to delays in transmission on the wireless backhaul connection between base station 12 and relay-UE 28. For example, if relay-UE 28 requests resources and base station 12 does not within a timely manner grant to relay-UE 28 all of the requested resources, relay-UE 28 may be forced to temporarily buffer data at relay-UE 28 until relay-UE 28 is granted resources to transmit the data to base station 12. Similarly, due to congestion on the air interface, base station 12 may be forced to temporarily buffer data at base station 12 until resources are available to transmit data to relay-UE 28. Delays on the wireless backhaul connection could pose a problem for one or more of the UEs 36, such as delays in transmissions of control and bearer data to and from the one or more UEs 36, resulting in a poor user experience.

With the arrangement of FIG. 1, in line with the discussion above, the present disclosure provides for managing communication between base station 12 and relay 34 over the wireless backhaul connection. Per the discussion above, base station 12 may be configured to monitor the number of UEs being served by relay base station 32 and monitor the level of load on the air interface over which base station 12 serves UEs. When relay base station 32 is serving so many UEs and the load becomes so high that base station 12 cannot sufficiently provide uplink and/or downlink resources, base station 12 can take remedial action to free up air interface capacity. For instance, when relay base station 32 is serving a threshold number of UEs and the air interface is threshold highly congested, base station 12 can respond to that scenario by selecting one or more non-relay UEs 30 and handing over the selected one or more non-relay UEs 30 to another base station other than base station 12 so as to free up capacity to better serve relay-UE 28. Similarly, base station 12 could hand over one or more non-relay UEs 30 to a first other base station and hand over one or more other non-relay UEs 30 to a second other base station.

The high congestion here could be defined in various ways. By way of example, the congestion level of the LTE air interface could be defined as a percentage or other measure of resources (e.g., resource elements or PRBs) used over time, such as a running average of percentage of downlink and/or uplink PRBs that base station 12 has allocated for use and/or a percentage of control channel resource elements used, or the like. Or the congestion level of the LTE air interface could be defined in terms of number of UEs currently served by base station 12 on the air interface, possibly weighed by their service levels or the like, among other possibilities. And the congestion level could be deemed "threshold high" by being higher than a defined threshold. For instance, the threshold could be a percentage of resource use, such as a percentage between 70% and 100% or the like, a number of served UEs, also perhaps as a percentage of a maximum limit, such as a percentage between 80% and 100% or the like. Thus, base station 12 may evaluate congestion of its air interface in various ways, and could thereby determine that load (congestion) on the air interface is threshold high.

Base station 12 could also determine in various ways that the relay base station 32 is serving a threshold high number of UEs. For example, base station 12 could receive from relay base station 32 a wireless transmission that indicates the number of UEs being served by relay base station 32, which base station 12 could then compare with a defined threshold number to determine whether the number of UEs is threshold high. The threshold number could be a percentage of a maximum limit of served UEs, such as a percentage between 80% and 100% or the like. Or the wireless transmission could specify whether or not the number of UEs being served by relay base station 32 is threshold high. Relay base station 32 could periodically transmit this wireless transmission to base station 12, or transmit this wireless transmission to base station 12 in response to receiving a request from base station 12. Alternatively, base station 12 could receive from MME 14 a message that indicates the number of UEs being served by relay base station 32 or that indicates whether or not the number of UEs being served by relay base station 32 is threshold high. MME 14 could send this message periodically to base station 12, or MME 14 could send this message to base station 12 in response to receiving a request from base station 12.

In one example, responsive to determining that the air interface is threshold highly congested, base station 12 may then determine whether or not relay base station is serving a threshold high number of UEs. For example, responsive to determining that the air interface is threshold highly congested, base station 12 may send to relay base station 32 or MME 14 a request for information regarding the number of UEs that relay base station 32 is serving. Relay base station 32 or MME 14 may then respond to the request by providing information indicative of whether the relay base station 32 is serving a threshold high number of UEs.

In line with the discussion above, responsive to at least the determining that the air interface is threshold highly congested and that the relay base station is serving a threshold high number of UEs, base station 12 may then select one or more non-relay UEs 30 and hand over the selected one or more non-relay UEs 30 to another base station other than base station 12.

In some examples, base station 12 may select the one or more non-relay UEs 30 based at least on the selected one or more non-relay UEs 30 not being engaged in interruption-sensitive communication. At issue here is whether respective non-relay UEs are engaged in a communication via the LTE air interface that it would be preferable to not interrupt. Interruption-sensitive communications could be classified as packet-based real-time media communications, perhaps communications that the LTE network is set to provide with a guaranteed bit rate rather than as best-efforts traffic. Thus, examples of interruption-sensitive communication may be streaming audio communication, streaming video communication, gaming communication, video conference communication, medical application communication such as telesurgery, and security monitoring communication. Whereas, examples of communications that are not interruption-sensitive may be web browsing, e-mail communication, file transfer, and other more-typically best-efforts communication.

Base station 12 may determine whether a particular non-relay UE 30 is engaged in interruption-sensitive communication in various ways. By way of example, the base station may determine if a non-relay UE is currently RRC idle, in which case, the non-relay UE is not engaged in interruption-sensitive communication, or rather RRC connected, in which case the non-relay UE may be engaged in interruption-sensitive communication. Further, if the non-relay UE is RRC connected, then the non-relay UE could consider a quality of service class (e.g., QCI) of a bearer that the LTE network has established for the non-relay UE, as an indication of the type of communication in which the non-relay UE is engaged (which could be communication in which the non-relay UE is currently engaged or in which the non-relay UE is currently set to engage (by having a bearer or other such session over which to engage in the communication)). For instance, if the non-relay UE has at least one guaranteed-bit-rate bearer with QCI 1-4 (e.g., video call, gaming, or video streaming), the base station could conclude that the non-relay UE is engaged in interruption-sensitive communication. Whereas, if the non-relay UE has only one or more default (non-guaranteed-bit-rate) bearers with QCI 6-9 (e.g., TCP based services, buffered video, file transfer, e-mail, chat, etc.), the base station could conclude that the non-relay UE is not engaged in interruption-sensitive communication.

As another example, base station 12 may determine whether a particular non-relay UE 30 is engaged in interruption-sensitive communication by determining the type of communication in which a UE is engaged. For instance, base station 12 could determine by deep packet inspection or other techniques, the type of communication a non-relay UE 30 is engaged in, and then determine if that type is interruption-sensitive. Base station 12 may have data mapping communication types to indications of whether communication is interruption-sensitive or not, and could use the data to determine if a type of communication in which a non-relay UE is engaged in is interruption-sensitive or not. Other examples are possible as well.

Further in line with the discussion above, base station 12 could be configured to select the other base station based at least on the other base station having sufficient capacity to serve the selected one or more non-relay UEs. For example, base station 12 may identify a plurality of neighboring base stations, and select the other base station from among the plurality of neighboring base stations based at least on the other base station having threshold low air interface load.

Base station 12 may determine the plurality of neighboring base stations by identifying one or more non-relay UEs 30 that are not engaged in interruption-sensitive communication, and requesting that those one or more non-relay UEs provide to base station 12 radio measurement reports. The radio measurement reports may indicate strength of neighboring base station coverage detected by the one or more non-relay UEs. Thus, the radio measurement reports may identify candidate neighboring base stations to which one or more non-relay UEs could be offloaded. Alternatively, base station 12 may have already received such reports from non-relay UEs 30 and may analyze the reports to identify the candidate neighboring base stations.

As discussed above, base station 12 could then select the other base station from among the neighboring base stations identified in the radio measurement reports, with the selecting based at least on the other base station having threshold low air interface load. In one example, base station 12 could select the neighboring base station having the lowest air interface load, provided that the load is threshold low. Base station 12 could receive load information for the neighboring base stations over an interface with the neighboring base station such as an X2 interface. The load could be deemed threshold low by being lower than a defined threshold. For instance, the threshold could be a percentage of resource use, such as a percentage between 0% and 65% or the like, a number of served UEs, also perhaps as a percentage of a maximum limit, such as a percentage between 0% and 75% or the like. The defined threshold may be less than a defined threshold that is used to determine whether the air interface over which base station 12 serves UEs is threshold highly congested.

The selection of the neighboring base station from among the neighboring base stations may also be based at least in part on one or more other factors. For instance, base station 12 may select the neighboring base station based on air interface load as well as average signal strength of transmissions received by non-relay UEs from the neighboring base station. Other examples are possible as well.

After selecting the neighboring base station from among the neighboring base stations, base station 12 could then select the one or more non-relay UEs to be handed over to the selected neighboring base station, with the selecting being based on the selected one or more non-relay UEs having reported detecting coverage of the selected neighboring base station and the selected one or more non-relay UEs not being engaged in interruption-sensitive communication. For instance, base station 12 could determine which non-relay UEs have reported detecting coverage of the selected neighboring base station and are also not engaged in interruption-sensitive communication, and hand over one or more of the determined non-relay UEs to the selected neighboring base station.

In a scenario in which multiple non-relay UEs have reported detecting coverage of the selected neighboring base station and are also not engaged in interruption-sensitive communication, base station 12 may select which of the multiple non-relay UEs should be handed over based on the signal strength of transmissions received from the selected neighboring base station by each of the non-relay UEs and/or historical air interface resource usage by each of the non-relay UEs. By way of example, base station 12 may calculate a score for each of the multiple non-relay UEs based on signal strength and/or historical air interface resource usage, with signal strength being directly proportional to the score and historical air interface resource usage also being directly proportional to the score. Historical air interface resource usage could be defined as a percentage or other measure of resources (e.g., resource elements or PRBs) used over time, such as a running average of percentage of downlink and/or uplink PRBs that base station 12 has allocated to a respective non-relay UE for communicating with base station 12. After calculating scores for each of the multiple non-relay UEs, base station 12 may then select one or more of the multiple non-relay UEs having the highest score(s). In this manner, base station 12 could select non-relay UEs that have detected stronger coverage of the selected neighboring base station than other non-relay UEs and/or have engaged in heavier air interface resource usage than other non-relay UEs.

Moreover, there may also be additional triggers that cause base station 12 to select and hand over one or more non-relay UEs 30 to another base station. As one example, base station 12 could be configured to determine that relay-UE 28 has a threshold high amount of buffered data to be transmitted to base station 12. For instance, base station 12 could receive from relay-UE 28 a buffer status report. The buffer status report may specify an amount of buffered data at relay-UE 28 to be transmitted to base station 12 over the wireless backhaul connection. Base station 12 could then determine that the amount of buffered data exceeds a threshold amount. Based on at least determining that (i) the air interface is threshold highly congested, (ii) relay base station 32 is serving a threshold high number of UEs, and (iii) the amount of buffered data exceeds the threshold amount, base station 12 may then select one or more non-relay UEs 30 and hand over the selected one or more non-relay UEs 30 to another base station other than base station 12.

As another example, base station 12 could be configured to determine that a particular base station other than base station 12 has threshold low air interface load. For instance, base station 12 may receive load information for one or more neighboring base stations, and determine that the load on the air interface over which one of the neighboring base stations serves UEs is threshold low. Based on at least determining that (i) the air interface over which base station 12 serves UEs is threshold highly congested, (ii) relay base station 32 is serving a threshold high number of UEs, and (iii) the particular base station has threshold low air interface load over the air interface which the particular base station serves UEs, base station 12 may then select one or more non-relay UEs 30 and hand over the selected one or more non-relay UEs 30 to the particular base station.

Figure 2:
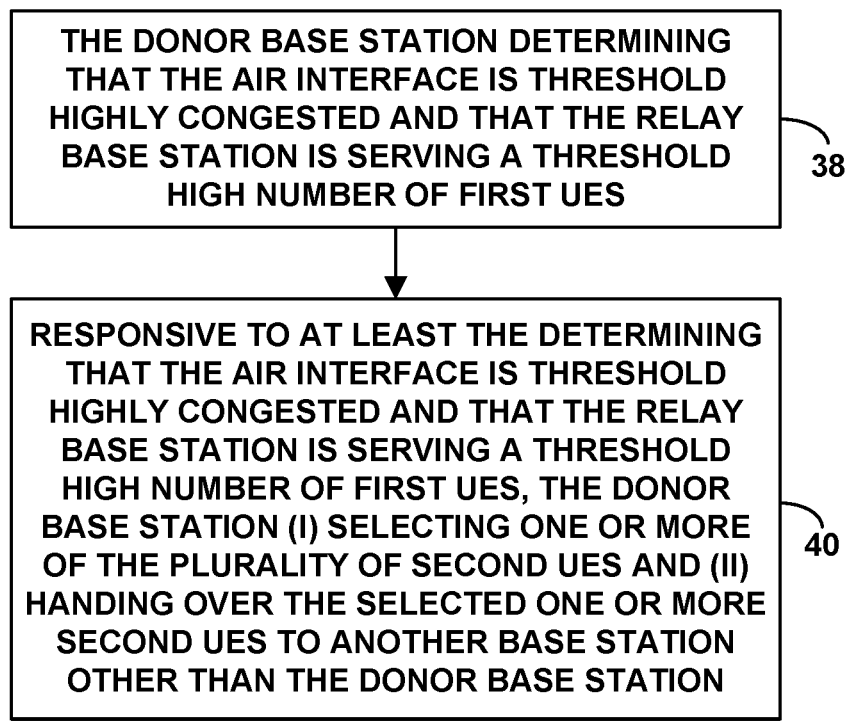
FIG. 2 is a flow chart depicting example operations in accordance with the disclosure.

FIG. 2 is next a flow chart depicting some of these operations in an example method, to manage communication over a wireless backhaul connection between a donor base station and a relay. In line with the discussion above, these operations could be carried out in an access network in which the relay includes a relay base station and a relay-UE that provides wireless backhaul connectivity for the relay base station. The donor base station may serve the relay-UE over an air interface defining the wireless backhaul connection. Further, the relay base station may serve one or more first UEs, and the donor base station may serve a plurality of second UEs.

As shown in FIG. 2, at block 38, the method includes the donor base station determining that the air interface is threshold highly congested and that the relay base station is serving a threshold high number of first UEs. And at block 40, the method includes, responsive to at least the determining that the air interface is threshold highly congested and that the relay base station is serving a threshold high number of first UEs, the donor base station (i) selecting one or more of the plurality of second UEs and (ii) handing over the selected one or more second UEs to another base station other than the donor base station. Advantageously, the method may free up capacity on the air interface to better serve the relay-UE, and thus, to better serve the UEs being served by the relay-UE.

In line with the discussion above, selecting the one or more of the plurality of second UEs could involve selecting one or more non-relay UEs based at least on the one or more non-relay UEs not being engaged in interruption-sensitive communication.

Further in line with the discussion above, the other base station could be selected from a plurality of neighboring base stations based at least on the selected other base station having threshold low air interface load. With this approach, one or more of the plurality of second UEs could be selected based at least on the selected one or more second UEs having reported detecting coverage of the selected other base station.

Figure 3:
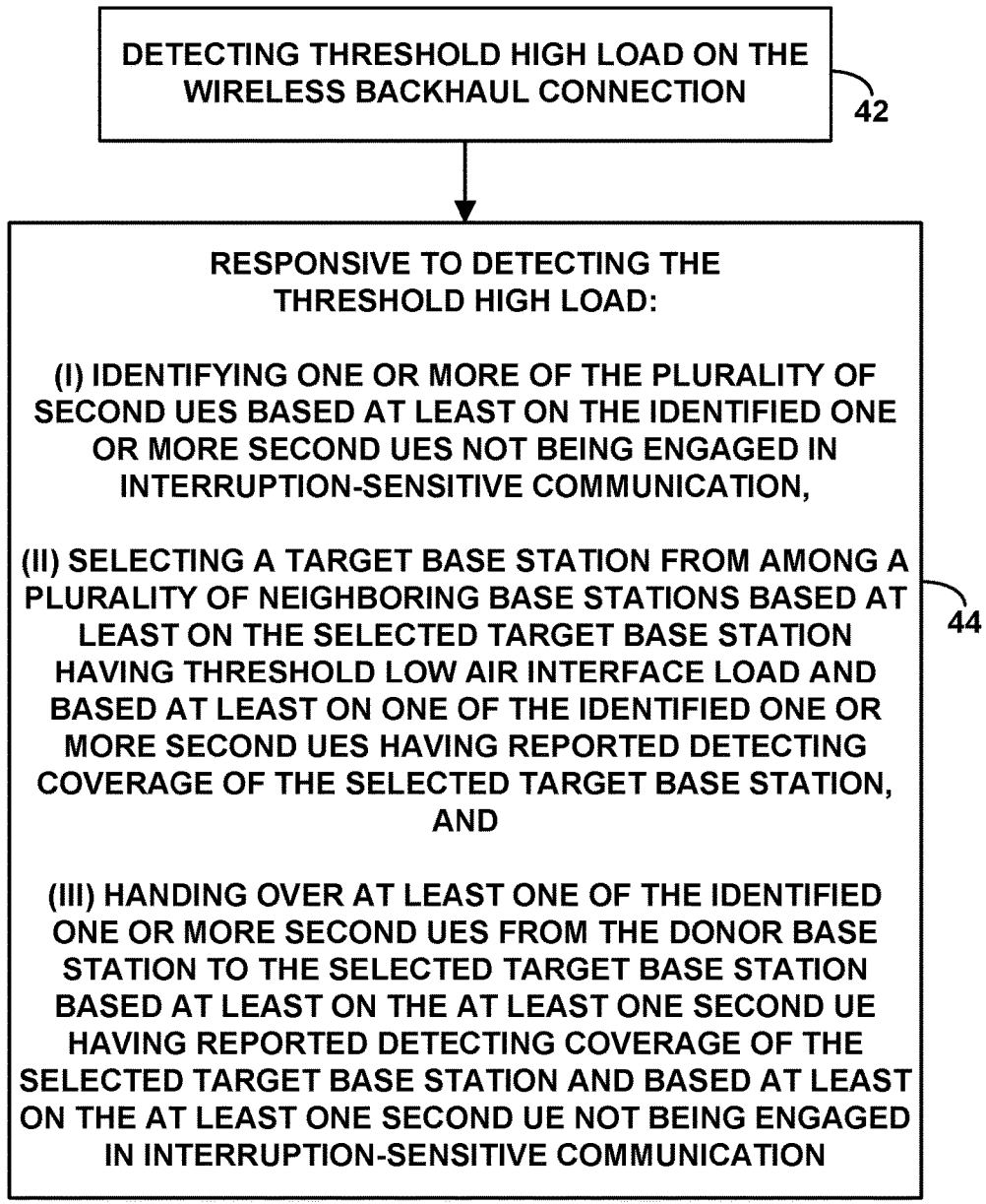
FIG. 3 is another flow chart depicting example operations in accordance with the disclosure.

FIG. 3 is next another flow chart depicting some of the above operations in an example method, to manage communication over a wireless backhaul connection between a donor base station and a relay. These operations could be carried out in an access network in which the relay includes a relay base station and a relay-UE that provides wireless backhaul connectivity for the relay base station. The donor base station may serve the relay-UE over an air interface defining the wireless backhaul connection. Further, the relay base station may serve one or more first UEs, and the donor base station may serve a plurality of second UEs.

As shown in FIG. 3, at block 42, the method includes detecting threshold high load on the wireless backhaul connection. And at block 44, the method includes, responsive to detecting the threshold high load: (i) identifying one or more of the plurality of second UEs based at least on the identified one or more second UEs not being engaged in interruption-sensitive communication, (ii) selecting a target base station from among a plurality of neighboring base stations based at least on the selected target base station having threshold low air interface load and based at least on one of the identified one or more second UEs having reported detecting coverage of the selected target base station, and (iii) handing over at least one of the identified one or more second UEs from the donor base station to the selected target base station based at least on the at least one second UE having reported detecting coverage of the selected target base station and based at least on the at least one second UE not being engaged in interruption-sensitive communication.

In line with the discussion above, this process can be carried out by the donor base station. Further, in this process, the act of detecting threshold high load on the wireless backhaul connection could include determining that the relay base station is serving a threshold high number of first UEs and/or determining that an amount of buffered data at the relay-UE to be transmitted to the donor base station exceeds a threshold amount.

Further in line with the discussion above, in this process, the at least one second UE could be selected based at least on historical air interface resource usage by the at least one second UE relative to historical air interface resource usage by other second UEs having reported detecting coverage of the selected target base station. For instance, the at least one second UE could be selected based at least on the historical air interface resource usage by the at least one second UE being greater than the historical air interface resource usage by another one of the second UEs having reported detecting coverage of the selected target base station.

Figure 4:
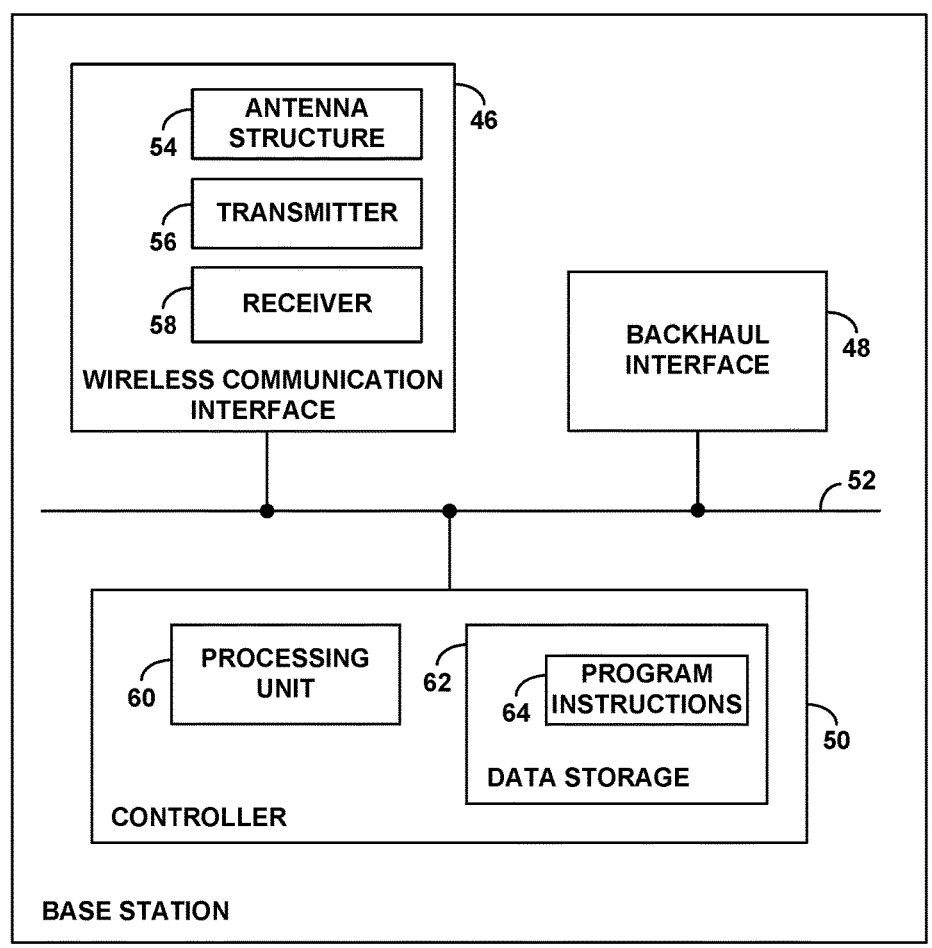
FIG. 4 is a simplified block diagram of an example base station operable in accordance with the disclosure.

Finally, FIG. 4 is a simplified block diagram of an example base station operable in an access network to manage communication over a wireless backhaul connection between the base station and a relay, with the relay including a relay base station and a relay-UE that provides wireless backhaul connectivity for the relay base station. As shown in FIG. 4, the example base station includes a wireless communication interface 46, a backhaul interface 48, and a controller 50. These components are shown communicatively linked together by a system bus or other communication link 52, but it will be understood that the components could alternatively be integrated together or distributed in various ways. For instance, aspects of the controller could be provided in a chipset that implements functions of the wireless communication interface 46. Other examples are possible as well.

As shown, wireless communication interface 46 could include an antenna structure 54, a transmitter 56, and a receiver 58, cooperatively facilitating air interface communication with one or more served UEs. As such, transmitter 56 could be configured to transmit downlink air interface communication in a plurality of downlink channels, and receiver 58 could be configured to receive uplink air interface communication in a plurality of uplink channels.

Backhaul interface 48 could then include a wired or wireless network interface, such as an Ethernet interface, through which the base station could communicate with other entities of a core network. And as shown, controller 50 could including a processing unit (one or more processors) 60, non-transitory data storage 62, and program instructions 64 stored in the non-transitory data storage and executable by the processing unit to carry out various operations described herein. As such, when the base station serves a relay-UE over an air interface defining a wireless backhaul connection between the base station and a relay, the controller could be configured to determine that the air interface is threshold highly congested. In addition, the controller could be configured to determine that a relay base station that the relay-UE provides wireless backhaul connectivity for is serving a threshold high number of UEs. And the controller could respond to at least the determining that the air interface is threshold highly congested and that the relay base station is serving a threshold high number of UEs by (i) selecting one or more of a plurality of UEs served by the base station and (ii) handing over the selected one or more UEs to another base station other than the base station.

Exemplary embodiments have been described above. Those skilled in the art will understand, however, that changes and modifications may be made to these embodiments without departing from the true scope and spirit of the invention.

We claim:

1. A method of managing communication over a wireless backhaul connection between a donor base station and a relay, wherein the relay comprises a relay base station and a relay user equipment device (relay-UE) that provides wireless backhaul connectivity for the relay base station, wherein the donor base station serves the relay-UE over an air interface defining the wireless backhaul connection, wherein the relay base station serves one or more first user equipment devices (UEs), and wherein the donor base station serves a plurality of second UEs over the air interface, the method comprising:

determining, by the donor base station, that the air interface is threshold highly congested and that the relay base station is serving a threshold high number of first UEs;

responsive to at least the determining that the air interface is threshold highly congested and that the relay base station is serving a threshold high number of first UEs, the donor base station (i) selecting one or more of the plurality of second UEs and (ii) handing over the selected one or more second UEs to another base station other than the donor base station.

2. The method of claim 1, further comprising:

receiving, by the donor base station from the relay-UE, a buffer status report, wherein the buffer status report specifies an amount of buffered data at the relay-UE to be transmitted to the donor base station over the wireless backhaul connection; and determining, by the donor base station, that the amount of buffered data exceeds a threshold amount, wherein the selecting and handing over are further responsive to the determining that the amount of buffered data exceeds the threshold amount.

3. The method of claim 1, further comprising selecting the one or more of the plurality of second UEs based at least on the selected one or more second UEs not being engaged in interruption-sensitive communication.

4. The method of claim 3, further comprising determining whether each of the plurality of second UEs is engaged in interruption-sensitive communication based on a quality of service class of a bearer over which the UE is set to engage in communication.

5. The method of claim 1, further comprising:

identifying a plurality of neighboring base stations;

selecting the other base station from among the plurality of neighboring base stations based at least on the selected other base station having threshold low air interface load; and selecting the one or more of the plurality of second UEs based at least on the selected one or more second UEs having reported detecting coverage of the selected other base station.

6. The method of claim 5, wherein identifying the plurality of neighboring base stations comprises:

determining that one or more particular UEs of the plurality of second UEs are not engaged in interruption-sensitive communication;

requesting that the one or more particular UEs provide to the donor base station radio measurement reports, wherein the radio measurement reports indicate strength of neighboring base station coverage detected by the one or more particular UEs; and identifying a plurality of neighboring base stations indicated in the radio measurement reports.

7. The method of claim 1, further comprising determining, by the donor base station, that the other base station has threshold low air interface load, wherein the selecting and handing over are further responsive to the determining that the other base station has threshold low air interface load.

8. The method of claim 7, further comprising selecting the one or more of the plurality of second UEs based at least on the selected one or more second UEs having reported detecting coverage of the other base station.

9. The method of claim 7, further comprising selecting the one or more of the plurality of second UEs based at least on the selected one or more second UEs having reported detecting coverage of the other base station and based at least on the selected one or more second UEs not being engaged in interruption-sensitive communication.

10. A base station operable in an access network to manage communication over a wireless backhaul connection between the base station and a relay, wherein the relay comprises a relay base station and a relay user equipment device (relay-UE) that provides wireless backhaul connectivity for the relay base station, wherein the base station serves the relay-UE over an air interface defining the wireless backhaul connection, wherein the relay base station serves one or more first user equipment devices (UEs), and wherein the base station serves a plurality of second UEs over the air interface, the base station comprising:

a wireless communication interface configured for communicating over the air interface; and a controller comprising at least one processing unit, data storage, and program instructions stored in the data storage and executable by the processing unit to carry out operations comprising:

determining that the air interface is threshold highly congested and that the relay base station is serving a threshold high number of first UEs;

responsive to at least the determining that the air interface is threshold highly congested and that the relay base station is serving a threshold high number of first UEs, (i) selecting one or more of the plurality of second UEs and (ii) handing over the selected one or more second UEs to another base station other than the base station.

11. The base station of claim 10, wherein the operations further comprise:

receiving from the relay-UE a buffer status report, wherein the buffer status report specifies an amount of buffered data at the relay-UE to be transmitted to the base station over the wireless backhaul connection; and determining that the amount of buffered data exceeds a threshold amount, wherein the selecting and handing over are further responsive to the determining that the amount of buffered data exceeds the threshold amount.

12. The base station of claim 10, wherein the operations further comprise selecting the one or more of the plurality of second UEs based at least on the selected one or more second UEs not being engaged in interruption-sensitive communication.

13. The base station of claim 10, wherein the operations further comprise:

identifying a plurality of neighboring base stations;

selecting the other base station from among the plurality of neighboring base stations based at least on the selected other base station having threshold low air interface load; and selecting the one or more of the plurality of second UEs based at least on the selected one or more second UEs having reported detecting coverage of the selected other base station.

14. The base station of claim 13, wherein identifying the plurality of neighboring base stations comprises:

determining that one or more particular UEs of the plurality of second UEs are not engaged in interruption-sensitive communication;

requesting that the one or more particular UEs provide to the base station radio measurement reports, wherein the radio measurement reports indicate strength of neighboring base station coverage detected by the one or more particular UEs; and identifying a plurality of neighboring base stations indicated in the radio measurement reports.

15. The base station of claim 10:

wherein the operations further comprise determining that the other base station has threshold low air interface load, and wherein the selecting and handing over are further responsive to the determining that the other base station has threshold low air interface load.

16. The base station of claim 15, wherein the operations further comprise selecting the one or more of the plurality of second UEs based at least on the selected one or more second UEs having reported detecting coverage of the other base station.

17. A method of managing communication over a wireless backhaul connection between a donor base station and a relay, wherein the relay comprises a relay base station and a relay user equipment device (relay-UE) that provides wireless backhaul connectivity for the relay base station, wherein the donor base station serves the relay-UE over an air interface defining the wireless backhaul connection, wherein the relay base station serves one or more first user equipment devices (UEs), and wherein the donor base station serves a plurality of second UEs over the air interface, the method comprising:

detecting threshold high load on the wireless backhaul connection;

responsive to detecting the threshold high load, (i) identifying one or more of the plurality of second UEs based at least on the identified one or more second UEs not being engaged in interruption-sensitive communication, (ii) selecting a target base station from among a plurality of neighboring base stations based at least on the selected target base station having threshold low air interface load and based at least on one of the identified one or more second UEs having reported detecting coverage of the selected target base station, and (iii) handing over at least one of the identified one or more second UEs from the base station to the selected target base station based at least on the at least one second UE having reported detecting coverage of the selected target base station and based at least on the at least one second UE not being engaged in interruption-sensitive communication.

18. The method of claim 17, further comprising determining, based on radio measurement reports received from the plurality of second UEs, the plurality of neighboring base stations.

19. The method of claim 17, further comprising selecting the at least one second UE based at least on historical air interface resource usage by the at least one second UE.

20. The method of claim 17, wherein detecting the threshold high load on the wireless backhaul connection comprises determining that the relay base station is serving a threshold high number of first UEs.

* * * * *